US012578886B2

(12) United States Patent
Kim et al.

(10) Patent No.: US 12,578,886 B2
(45) **Date of Patent: *Mar. 17, 2026**

(54) METHOD AND APPARATUS FOR MEMORY MANAGEMENT IN MEMORY DISAGGREGATION ENVIRONMENT

(71) Applicants:Electronics and Telecommunications Research Institute, Daejeon (KR); SYSGEAR CO., Ltd., Seoul (KR)

(72) Inventors: Chang-Dae Kim, Daejeon (KR); Kwang-Won Koh, Daejeon (KR); Kang-Ho Kim, Daejeon (KR); Tae-Hoon Kim, Daejeon (KR); Sang-Ho Eom, Seoul (KR)

(73) Assignees: ELECTRONICS AND TELECOMMUNICATIONS RESEARCH INSTITUTE, Daejeon (KR); SYSGEAR CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/015,326

(22) Filed: Jan. 9, 2025

(65) Prior Publication Data

US 2025/0147680 A1     May 8, 2025

Related U.S. Application Data

(63) Continuation of application No. 18/126,232, filed on Mar. 24, 2023, now Pat. No. 12,223,186.

(30) Foreign Application Priority Data

Mar. 25, 2022     (KR) ........................ 10-2022-0037288
Feb. 20, 2023     (KR) ........................ 10-2023-0022075

(51) Int. Cl.
*G06F 3/06*               (2006.01)

(52) U.S. Cl.
CPC .......... *G06F 3/0631* (2013.01); *G06F 3/0616* (2013.01); *G06F 3/0619* (2013.01); (Continued)

(58) Field of Classification Search
CPC .... G06F 3/0616; G06F 3/0619; G06F 3/0631; G06F 3/0664; G06F 3/0683; G06F 3/0688
(Continued)

(56) References Cited

U.S. PATENT DOCUMENTS 8,886,901 B1     11/2014   Hsu et al.
10,474,371 B1    11/2019   Ravindranath et al.
(Continued)

FOREIGN PATENT DOCUMENTS

KR     10-2010-0012263       2/2010
KR     10-2014-0109689       9/2014
(Continued)

OTHER PUBLICATIONS

P. Huang, G. Wu, X. He, and W. Xiao. An aggressive worn-out flash block management scheme to alleviate SSD performance degradation. In Proceedings of the Ninth European Conference on Computer Systems (EuroSys '14). Association for Computing Machinery, New York, NY, USA, Article 22, 1-14. (Year: 2014).
(Continued)

*Primary Examiner* — Reginald G Bragdon
*Assistant Examiner* — Aaron D Ho
(74) *Attorney, Agent, or Firm* — KILE PARK REED & HOUTTEMAN PLLC

(57)                ABSTRACT

Disclosed herein is a method for memory management in a memory disaggregation environment. The method includes generating virtual memory based on multiple first memory devices, determining whether a condition for allocation acceleration is satisfied by the first memory devices, and
(Continued)

allocating a memory page to the first memory devices based on whether the condition for allocation acceleration is satisfied.

9 Claims, 5 Drawing Sheets

(52) U.S. Cl.
 CPC .......... *G06F 3/0664* (2013.01); *G06F 3/0683* (2013.01); *G06F 3/0688* (2013.01)

(58) Field of Classification Search
 USPC ........................................................ 711/154
 See application file for complete search history.

(56) References Cited

U.S. PATENT DOCUMENTS

| | | |
|---|---|---|
| 2010/0023677 A1 | 1/2010 | Shin et al. |
| 2016/0034206 A1 | 2/2016 | Ryan et al. |
| 2016/0292025 A1 | 10/2016 | Gupta et al. |
| 2017/0149931 A1 | 5/2017 | Lochhead et al. |
| 2018/0011642 A1 | 1/2018 | Koseki et al. |
| 2018/0275894 A1 | 9/2018 | Yoshino et al. |
| 2019/0042106 A1 | 2/2019 | Klein et al. |
| 2019/0129646 A1 | 5/2019 | Kang et al. |
| 2021/0026547 A1 | 1/2021 | Peh et al. |
| 2021/0096776 A1 | 4/2021 | Kim et al. |
| 2021/0249085 A1 | 8/2021 | Hong et al. |
| 2021/0306304 A1 | 9/2021 | Hwang et al. |

| | | | |
|---|---|---|---|
| 2021/0373788 A1* | 12/2021 | Martin | .................. G06F 3/0646 |
| 2021/0390056 A1 | 12/2021 | Koh et al. | |
| 2023/0259774 A1 | 8/2023 | Wang et al. | |

FOREIGN PATENT DOCUMENTS

| | | | |
|---|---|---|---|
| KR | 10-1614650 | 4/2016 | |
| KR | 10-2017-0096444 | 8/2017 | |
| KR | 10-2088945 | 4/2020 | |
| KR | 10-2020-0092237 | 8/2020 | |
| KR | 10-2021-0100265 | 8/2021 | |
| WO | WO-2019005108 A1* | 1/2019 | ........... G06F 16/252 |

OTHER PUBLICATIONS

Li-Pin Chang, Yu-Syun Liu, and Wen-Huei Lin. 2016. Stable Greedy: Adaptive Garbage Collection for Durable Page-Mapping Multichannel SSDs. ACM Trans. Embed. Comput. Syst. 15, 1, Article 13 (Feb. 2016), 25 pages. https://doi.org/10.1145/2820613 (Year: 2016).

Huang, Jian, Anirudh Badam, Laura Caulfield, Suman Nath, Sudipta Sengupta, Bikash Sharma, and Moinuddin K. Qureshi. "{FlashBlox}: Achieving Both Performance Isolation and Uniform Lifetime for Virtualized {SSDs}." In 15th USENIX Conference on File and Storage Technologies (FAST 17), pp. 375-390. 2017. (Year: 2017).

P. Forouhar and F. Safaei, "Improving Utilization and Life-Span in Parallel Aware MLC-Based SSD Using Virtual Blocks," in IEEE Access, vol. 8, pp. 48212-48225, 2020, doi: 10.1109/ACCESS.2020. 2978982. (Year: 2020).

* cited by examiner

START

GENERATE VIRTUAL MEMORY BASED ON
MULTIPLE FIRST MEMORY DEVICES                    ~S110

DETERMINE WHETHER ACCELERATION CONDITION
IS SATISFIED BY FIRST MEMORY DEVICES             ~S120

ALLOCATE MEMORY PAGE TO FIRST MEMORY
DEVICES BASED ON WHETHER ACCELERATION           ~S130
CONDITION IS SATISFIED

END

230

710    720

METHOD AND APPARATUS FOR MEMORY MANAGEMENT IN MEMORY DISAGGREGATION ENVIRONMENT

CROSS REFERENCE TO RELATED APPLICATIONS

This is a continuation application of U.S. patent application Ser. No. 18/126,232 filed Mar. 24, 2023 (now pending), the disclosure of which is incorporated herein by reference in its entirety. U.S. patent application Ser. No. 18/126,232 claims the benefit of Korean Patent Applications No. 10-2022-0037288, filed Mar. 25, 2022, and No. 10-2023-0022075, filed Feb. 20, 2023, which are hereby incorporated by reference in their entireties into this application.

BACKGROUND OF THE INVENTION

1. Technical Field

The present disclosure relates to technology for managing memory in a memory disaggregation environment.

More particularly, the present disclosure relates to technology for managing memory having a limit on the number of writes, such as a Solid State Drive (SSD) or the like.

2. Description of the Related Art

The development of computer technology and network technology results in an increase in required computing resources. Also, thanks to the development of network technology, a cloud system for sharing computing resources is provided, and the demand therefor is increasing.

As the amount of processed data is increased, the required capacity of memory resources increases faster than other computing resources. Accordingly, an apparatus and method for memory management capable of responding to the increased capacity of memory resources are required.

Accordingly, a memory disaggregation technique in which a high-performance storage medium, such as a Solid State Drive (SSD) in a server, or memory of a remote server is used for memory expansion has been developed. The use of a medium such as an SSD or the like has advantages in terms of the configuration of a disaggregated memory system because of the low price per capacity. However, because such a medium has a limit on the number of writes, the use of the medium may be disadvantageous to a disaggregated memory system in which a large number of writes is caused.

DOCUMENTS OF RELATED ART (Patent Document 1) Korean Patent Application Publication No. 2010-0012263, titled "Semiconductor storage system and controlling method thereof".

SUMMARY OF THE INVENTION

An object of the present disclosure is to provide a memory management method capable of providing reliable, high-capacity memory at low cost.

Another object of the present disclosure is to prevent errors caused due to a limit on the number of writes when a memory system is configured using a medium having a limit on the number of writes, such as a Solid State Drive (SSD), or the like.

In order to accomplish the above objects, a method for memory management in a memory disaggregation environment according to an embodiment of the present disclosure includes generating virtual memory based on multiple first memory devices, determining whether a condition for allocation acceleration is satisfied by the first memory devices, and allocating a memory page to the first memory devices based on whether the condition for allocation acceleration is satisfied.

Here, the condition for allocation acceleration may correspond to the case in which the cumulative number of writes to the first memory device relative to a threshold value of the number of writes is greater than a preset percentage.

Here, allocating the memory page may comprise allocating a memory page corresponding to a write operation to the first memory device satisfying the condition for allocation acceleration.

Here, the condition for allocation acceleration may correspond to the case in which the end-of-life date of the first memory device and that of another first memory device fall within a preset period.

Here, allocating the memory page may comprise allocating a memory page corresponding to a write operation to a first memory device having the earliest end-of-life date, among first memory devices, the end-of-life dates of which fall within the preset period.

Here, the method may further include classifying the data to be stored into performance-sensitive data and general data. The performance-sensitive data may be allocated to the first memory device, and the general data may be allocated to a second memory device.

Here, the first memory device may correspond to a Solid State Drive (SSD), and the second memory device may correspond to Random Access Memory (RAM).

Here, the first memory devices may correspond to an active state or a standby state, and allocating the memory page may comprise allocating the memory page to first memory devices in the active state.

Here, the method may further include prohibiting a write operation in a first memory device reaching the end of its life, among the first memory devices in the active state, and migrating data in the first memory device reaching the end of its life to a first memory device in the standby state.

Here, migrating the data may be performed using a direct migration method by which the data of the first memory device reaching the end of its life is stored in the first memory device in the standby state or an indirect migration method by which, when data transferred to the first memory device through a read operation is modified, the modified data is stored in the first memory device in the standby state.

Here, the method may further include generating a first memory replacement message when the number of first memory devices in the standby state is less than a preset number.

Also, in order to accomplish the above objects, an apparatus for memory management in a memory disaggregation environment according to an embodiment of the present disclosure includes an acceleration determination unit for determining whether a condition for allocation acceleration is satisfied by multiple first memory devices constituting virtual memory and a memory control unit for allocating a memory page to the first memory devices based on whether the condition for allocation acceleration is satisfied.

Here, the condition for allocation acceleration may correspond to the case in which the cumulative number of writes to the first memory device relative to a threshold value of the number of writes is greater than a preset percentage.

Here, the memory control unit may allocate a memory page corresponding to a write operation to the first memory device satisfying the condition for allocation acceleration.

Here, the condition for allocation acceleration may correspond to the case in which the end-of-life date of the first memory device and that of another first memory device fall within a preset period.

Here, the memory control unit may allocate a memory page corresponding to a write operation to a first memory device having the earliest end-of-life date, among first memory devices, the end-of-life dates of which fall within the preset period.

Here, the apparatus may further include a data classification unit for classifying the data to be stored into performance-sensitive data and general data, and the data classification unit may allocate the performance-sensitive data to the first memory device and allocate the general data to a second memory device.

Here, the first memory device may correspond to a Solid State Drive (SSD), and the second memory device may correspond to Random Access Memory (RAM).

Here, the first memory devices may correspond to an active state or a standby state, and the memory control unit may allocate the memory page to first memory devices in the active state.

Here, the memory control unit may perform control so as to prohibit a write operation in a first memory device reaching the end of its life, among the first memory devices in the active state, and to migrate data in the first memory device reaching the end of its life to a first memory device in the standby state.

Here, the memory control unit may use a direct migration method by which the data of the first memory device reaching the end of its life is stored in a first memory device in the standby state or an indirect migration method by which, when data transferred to the first memory device through a read operation is modified, the modified data is stored in the first memory device in the standby state.

Here, the memory control unit may generate a first memory replacement message when the number of first memory devices in the standby state is less than a preset number.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
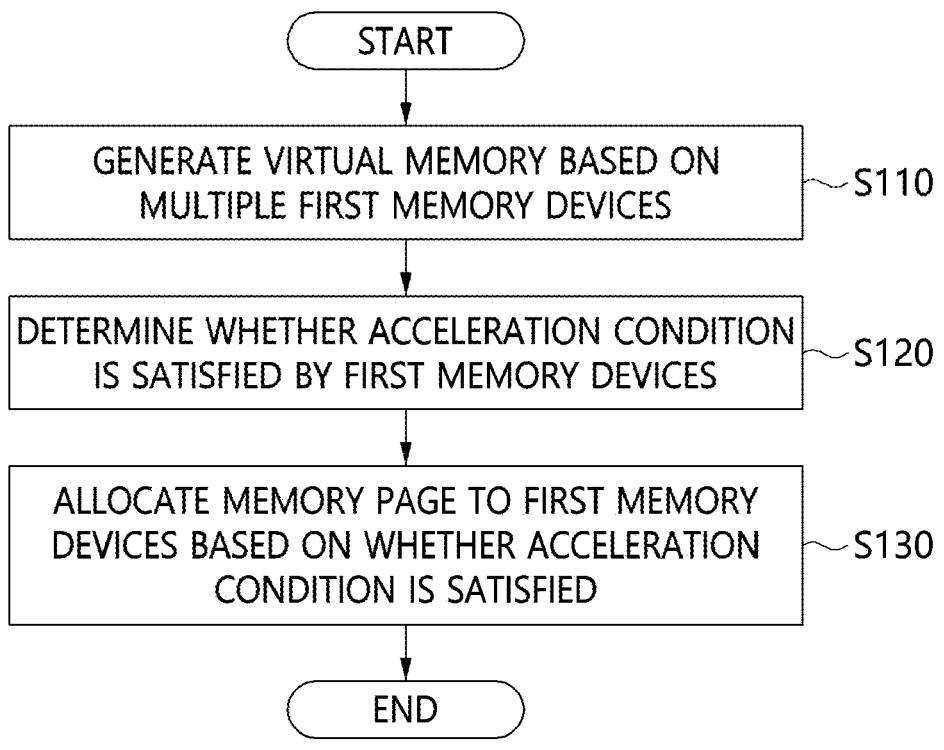
FIG. 1 is a flowchart illustrating a method for memory management in a memory disaggregation environment according to an embodiment of the present disclosure.

The advantages and features of the present disclosure and methods of achieving the same will be apparent from the exemplary embodiments to be described below in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only, and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

In the present specification, each of expressions such as "A or B", "at least one of A and B", "at least one of A or B", "A, B, or C", "at least one of A, B, and C", and "at least one of A, B, or C" may include any one of the items listed in the expression or all possible combinations thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a flowchart illustrating a memory management method in a memory disaggregation environment according to an embodiment of the present disclosure.

The memory management method in a memory disaggregation environment according to an embodiment of the present disclosure may be performed by a memory management apparatus or a memory management system.

Here, a memory unit in the memory management apparatus or the memory management system may correspond to a two-level memory unit. That is, the memory unit may include different types of first memory and second memory. Here, the first memory may correspond to memory having a limit on the number of writes, like an SSD.

Referring to FIG. 1, the memory management method in a memory disaggregation environment according to an embodiment of the present disclosure includes generating virtual memory based on multiple first memory devices at step S110, determining whether a condition for allocation acceleration is satisfied by the first memory devices at step S120, and allocating a memory page to the first memory devices based on whether the condition for allocation acceleration is satisfied at step S130.

Here, the condition for allocation acceleration may correspond to the case in which the cumulative number of writes to the first memory device relative to a threshold value of the number of writes is greater than a preset percentage.

Here, allocating the memory page at step S130 may comprise allocating a memory page corresponding to a write operation to the first memory device satisfying the condition for allocation acceleration.

Here, the condition for allocation acceleration may correspond to the case in which the end-of-life date of the first memory device and that of another first memory device fall within a preset period.

For example, when the end-of-life dates of the multiple first memory devices fall within a month, it may be determined that the condition for allocation acceleration is satisfied. However, the period for determining whether the condition for allocation acceleration is satisfied may vary depending on the state of the memory unit without being limited to a month.

Here, allocating the memory page at step S130 may comprise allocating a memory page corresponding to a write operation to the first memory device having the earliest end-of-life date, among the first memory devices, the end-of-life dates of which fall within the preset period.

Here, the method may further include classifying the data to be stored into performance-sensitive data and general data. Here, the performance-sensitive data may be allocated to the first memory device, and the general data may be allocated to a second memory device.

Here, the first memory device may correspond to a Solid State Drive (SSD), and the second memory device may correspond to Random Access Memory (RAM).

Here, the first memory devices may correspond to an active state or a standby state, and allocating the memory page may comprise allocating the memory page to the first memory devices in the active state.

Here, the method may further include prohibiting a write operation in the first memory device reaching the end of its life, among the first memory devices in the active state, and migrating data in the first memory device reaching the end of its life to the first memory device in the standby state.

Here, migrating the data may be performed using a direct migration method by which the data of the first memory device reaching the end of its life is stored in the first memory device in the standby state or an indirect migration method by which, when the data transferred to the first memory device through a read operation is modified, the modified data is stored in the first memory device in the standby state.

Here, the indirect migration method may correspond to a method in which, when data loaded into DRAM through a read operation is modified, the modified data is stored in the first memory device in the standby state.

Here, the method may further include generating a first memory replacement message when the number of first memory devices in the standby state is less than a preset number.

According to an embodiment of the present disclosure, there may be provided an apparatus, method, and program for two-level memory management that are capable of providing reliable, high-capacity memory at low cost by including a two-level memory unit including random access memory for storing data and a Solid State Drive (SSD) for storing data, a virtual machine unit for managing a memory page required for building or executing an application, and a memory control unit for allocating a memory page to at least one of the random access memory, or the SSD, or a combination thereof between the two-level memory unit and the virtual machine unit.

The present disclosure relates to a method for managing two-level memory using a medium having a limit on the number of writes, such as a Solid State Drive (SSD) or the like. A medium such as an SSD or the like has advantages in terms of the configuration of two-level memory because of the low price per capacity. However, because two-level memory causes a large number of writes to the medium, a problem may be caused when there is a limit on the number of writes, as in an SSD or the like.

The present disclosure may have the following effects in a two-level memory system using media such as an SSD and the like.

First, an error caused due to a limit on the number of writes may be prevented in two-level memory using media such as an SSD or the like. When an SSD reaches the limit on the number of writes, it may be detected in advance, and another SSD may be used instead.

Second, when a specific SSD is expected to reach a limit on the number of writes, writes are concentrated to the corresponding SSD, whereby SSDs used for the two-level memory system are made to reach the limit on the number of writes at different times. This reduces the probability that other SSDs also reach the limit on the number of writes while the SSD reaching the limit on the number of writes is detected and replaced, whereby the stability of the system may be improved.

Third, an indirect switch is performed for an SSD reaching the limit on the number of writes (that is, only data to be written thereto is moved to another SSD), whereby the SSD may be still used for a read operation, rather than immediately stopping the use of the SSD. Accordingly, the performance of the system may be maximized while considering the lifespan of the SSD.

Hereinafter, a method and apparatus for two-level memory management according to an embodiment of the present disclosure will be described in detail with reference to FIGS. 2 to 6.

Figure 2:
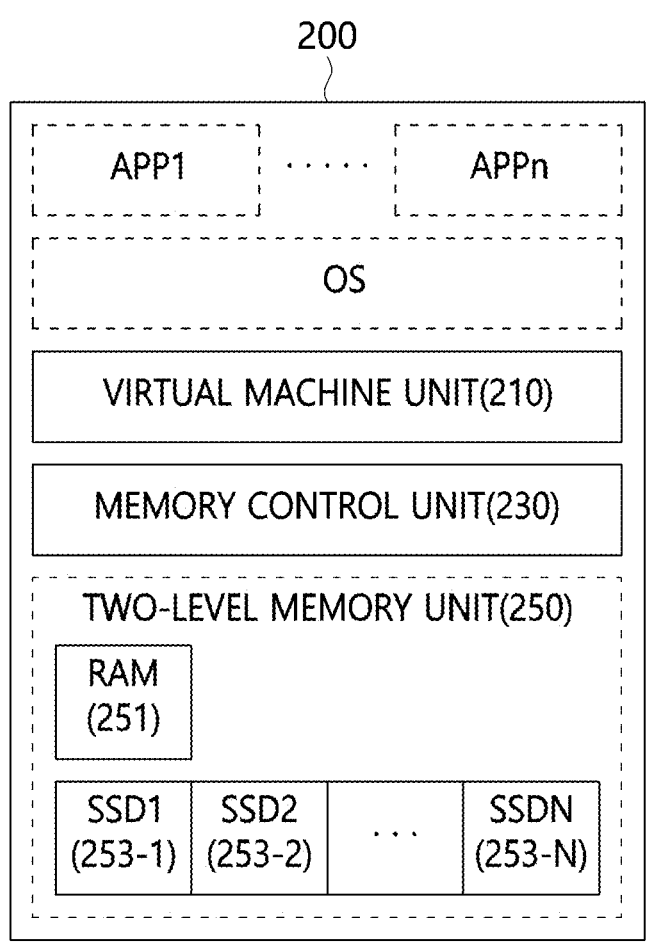
FIG. 2 is a block diagram illustrating the configuration of a memory management apparatus according to an embodiment of the present disclosure.

FIG. 2 is a block diagram illustrating the configuration of a memory management apparatus according to an embodiment of the present disclosure.

Referring to FIG. 2, a two-level memory management apparatus 200 may include a virtual machine unit 210, a memory control unit 230, and a two-level memory unit 250, and the two-level memory unit 250 may include random access memory 251 and multiple Solid State Drives (SSDs) 253.

The virtual machine unit 210 may manage a memory page required for building or executing an application (app). The virtual machine unit 210 may make the random access memory 251 and the multiple SSDs 253 operate as a single logical memory unit (virtual memory). The multiple memory devices, including the random access memory 251 and the multiple SSDs 253, are physically present, and the virtual machine unit 210 may generate virtual memory and map the same to the random access memory 251 or the multiple SSDs 253, which are physical memory.

The virtual machine unit 210 may set the number of SSDs to be used as memory depending on user input. For example, when the user input indicates that two SSDs of 1 GB are to be used as indirect memory, the virtual machine unit 210 may make the random access memory 251 and the two SSDs of 1 GB function as virtual memory.

Between the two-level memory unit 250 and the virtual machine unit 210, the memory control unit 230 may allocate a memory page to at least one of the random access memory 251, or the SSD 253, or a combination thereof.

According to an embodiment, the memory control unit 230 may classify the data to be stored into performance-sensitive data and general data based on the frequency of use of the data and required access speed. The memory control unit 230 may allocate the performance-sensitive data to the random access memory 251 and allocate the general data to the SSD 253.

Here, the performance-sensitive data may be data that is more frequently used than general data and is required to be accessed at a faster rate than general data. The random access memory 251 is allocated in order to store such performance-sensitive data, and the SSD 253 is allocated in order to store general data, whereby a high-performance, high-capacity memory use environment may be provided.

When it receives a command for writing or reading a memory page from the virtual machine unit 210, the memory control unit 230 may access the random access memory 251 or the SSD 253 depending on the performance sensitivity in order to perform the operation of writing or reading the memory page.

The memory control unit 230 may set one (e.g., 253-1) of the multiple SSDs 253-1, 253-2, 253-3, . . . , 253-N as an active SSD and set the other SSDs 253-2, 253-3, . . . , 253-N as standby SSDs.

Here, it is allowed to read/write data from/to the SSD set as the active SSD, but reading/writing data from/to the SSD set as the standby SSD may be prohibited. The process of detecting the end of the life of an SSD, which is performed by the memory control unit 230, will be described later with reference to FIG. 4 and FIG. 5.

The two-level memory unit 250 includes the random access memory 251 and the multiple SSDs 253, and depending on the type of the data to be stored, the data may be stored in the random access memory 251 or the SSD 253.

In an embodiment, the two-level memory unit 250 may be configured such that the random access memory 251 and the SSDs 253 are included in a single physical structure, as shown in FIG. 2.

In another embodiment, the random access memory 251 of the two-level memory unit 250 may be placed in a local node, and the SSD 253 may be placed in a remote node (cloud) connected over a network.

The random access memory 251 may include volatile memory or nonvolatile memory. The volatile memory may be dynamic random access memory (DRAM), static random access memory (SRAM), thyristor RAM (T-RAM), zero capacitor RAM (Z-RAM), or Twin Transistor RAM (TTRAM). The nonvolatile memory may be Electrically Erasable Programmable Read-Only Memory (EEPROM), flash memory, Magnetic RAM (MRAM), Phase change RAM (PRAM), or resistance memory.

Random access memory (direct memory) may temporarily store programs, data, or instructions. Programs, data, and instructions stored in a storage medium may be temporarily stored in the random access memory under the control of a CPU.

A Solid State Drive (SSD) (indirect memory) is widely used as a hard disk drive (HDD), but the SSD may be used as memory in the present disclosure. When random access memory and an SSD are used as two-level memory, large-capacity memory may be provided. Also, the SSD may support a Non-Volatile Memory Express (NVMe) interface. Because the NVMe interface has bandwidth similar to the bandwidth of random access memory, a problem in which memory access speed is decreased due to limited bandwidth may be prevented.

Figure 3:
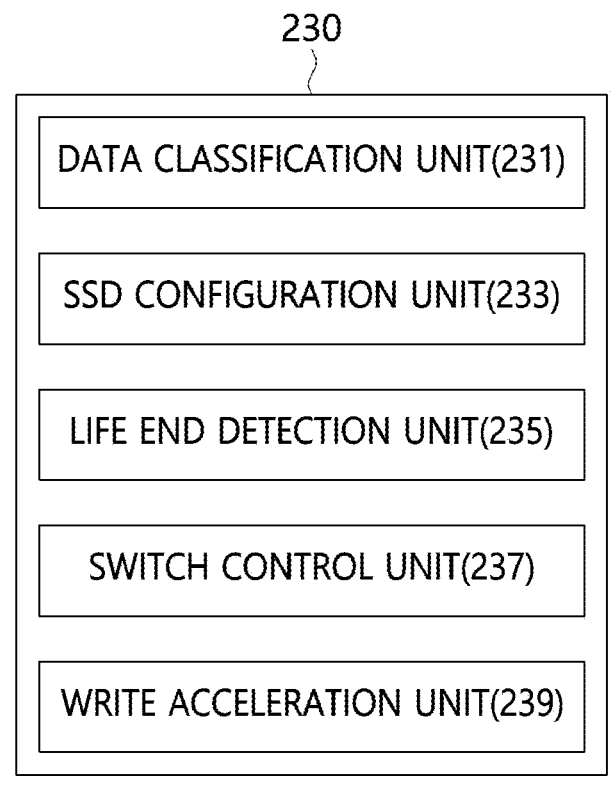
FIG. 3 is a block diagram illustrating the configuration of a memory control unit according to an embodiment of the present disclosure.

FIG. 3 is a block diagram illustrating the configuration of a memory control unit according to an embodiment of the present disclosure.

Referring to FIG. 3 a memory control unit 230 may include a data classification unit 231, an SSD configuration unit 233, a life end detection unit 235, a switch control unit 237, and a write acceleration unit 239.

The data classification unit 231 may classify the data to be stored into performance-sensitive data and general data, and may allocate the performance-sensitive data and the general data to random access memory 251 and an SSD, respectively. The performance-sensitive data and the general data may be differentiated from each other depending on the frequency of use of the data and the required access speed.

The SSD configuration unit 233 may set one or more of multiple SSDs 253 as active SSDs and set one or more of the other SSDs as standby SSDs. Which of the multiple SSDs 253 is set as the active SSD may be determined in the order of the serial numbers of the SSDs, in the order of the dates of production, in the order of the dates of the first use of the SSDs, in a random order, or the like.

The life end detection unit 235 may detect whether the life of the active SSD ends. Whether the life of the active SSD ends may be determined using a method of detecting the number of times a write operation is performed in the active SSD or a method of checking whether the active SSD operates normally through periodic writes to and reads from the active SSD.

In an embodiment, the number of writes may be counted each time a write operation is performed in the active SSD, or may be determined using a method of periodically executing a command of checking the state of the SSD. When the number of writes or the amount of written data exceeds the Total Bytes Written (TBW) specified in the product warranty specification provided by an SSD manufacturer, the life end detection unit 235 may determine that the life of the corresponding active SSD ends.

According to an embodiment, when the number of writes to the active SSD is greater than a first threshold value set based on the TBW specified in the product warranty specification, it may be determined that the life of the active SSD ends.

When it is determined that the life of the active SSD ends, the life end detection unit 235 prohibits writing to the corresponding active SSD and sets one of the standby SSDs as an active SSD so as to be used as indirect memory.

The switch control unit 237 may move or copy the data stored in the active SSD reaching the end of its life to a standby SSD or another active SSD. Here, the movement or copy of the data may be performed using a direct switch method or an indirect switch method.

The direct switch method may be a method in which the switch control unit 237 stores all of the data stored in the active SSD reaching the end of its life in a standby SSD (newly set as an active SSD). The direct switch method may require a heavy workload because reading and writing all of the stored data are required. Accordingly, the direct switch method may be performed when the workload of the system is low.

The indirect switch method may be a method in which the switch control unit 237 continues performing an operation of reading data from the active SSD reaching the end of its life, but does not perform an operation of writing new data thereto and in which the switch control unit 237 stores some data in another active SSD when a switch condition is satisfied. The indirect switch method may require a lower workload than the direct switch method because it is necessary to read and write only some of the stored data, rather than all of the stored data. Accordingly, the indirect switch method may be performed even when the workload of the system is high.

In an embodiment, when the percentage of valid data for which a read operation is performed for a preset period (e.g., six hours), among all of the data stored in the active SSD reaching the end of its life, is less than a second threshold value (e.g., 20%), the switch control unit 237 may store the valid data stored in the active SSD reaching the end of its life in an additional active SSD. When storing the valid data in the additional active SSD is completed, the switch control unit 237 may generate a replacement notification message saying that it is necessary to replace the SSD to which writing is prohibited. Accordingly, an administrator may recognize the end of the life of the SSD and replace the SSD reaching the end of its life (that is, the SSD to which writing is prohibited) with a new SSD.

In an embodiment, when the number of remaining standby SSDs is less than a preset third threshold value (e.g., 2), the switch control unit 237 may store the data stored in the SSD to which writing is prohibited in another active SSD and generate a replacement notification message saying that it is necessary to replace the SSD to which writing is prohibited. Accordingly, an administrator may always maintain a minimum number of standby SSDs to replace the SSD reaching the end of its life.

The write acceleration unit 239 may determine whether active SSDs satisfy an acceleration condition, set a single active SSD satisfying the acceleration condition as an accelerating active SSD when it determines that the acceleration condition is satisfied, concentrate write operations to the accelerating active SSD, and prevent an operation of writing to other active SSDs.

In an embodiment, the acceleration condition may be 1) the case in which the number of writes to any one of the multiple active SSDs is greater than a preset fourth threshold value (the fourth threshold value being less than the first threshold value), or 2) the case in which the difference between the expected end-of-life date E1 of the first active SSD and the expected end-of-life date E2 of the second active SSD, which are expected to reach the ends of their lives earliest among the multiple active SSDs, is equal to or less than a preset fifth threshold value.

When the end-of-life dates of the multiple active SSDs are close to each other, it is difficult to manage replacement of the SSDs. When the number of writes to a specific active SSD is greater than a predetermined threshold value (e.g., 70% of a limited number of lifetime writes), a write operation is concentrated to the specific active SSD, whereby the end of the life of the corresponding active SSD may be accelerated. Also, when the expected end-of-life dates of two active SSDs are close to each other (e.g., when the difference therebetween is shorter than one month), the end of the life of one of the active SSDs is accelerated so as to prevent the end-of-life dates of multiple active SSDs from overlapping each other, whereby the times at which the SSDs are to be replaced may be adjusted.

In an embodiment, the number of writes per day is calculated using previous data on the operation of writing to the active SSD, and the remaining lifespan is calculated based on the Total Bytes Written (TBW) specified in the product warranty specification, whereby the expected end-of-life date of the active SSD may be calculated.

Figure 4:
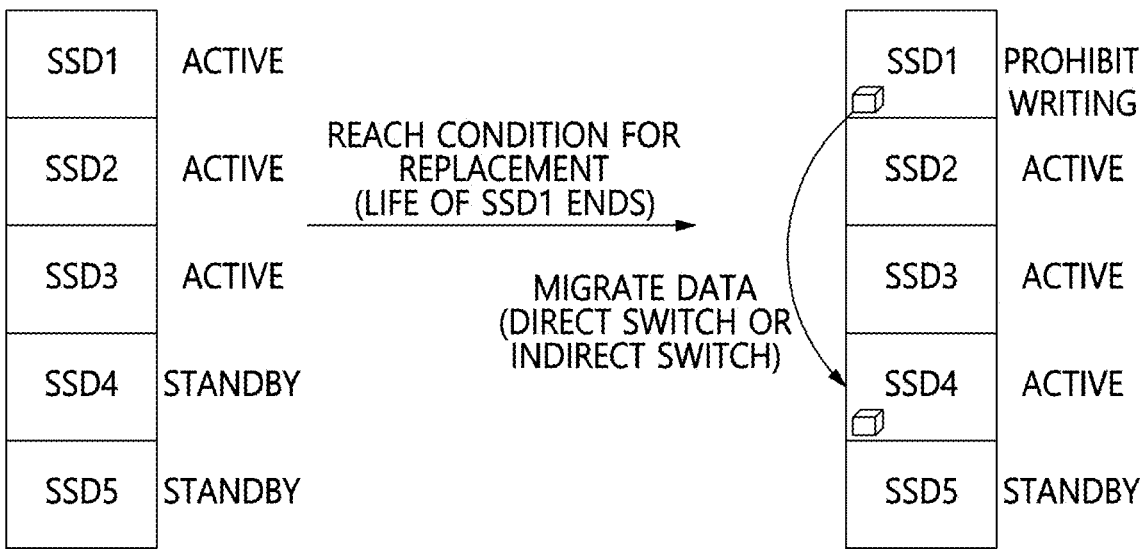
FIG. 4 is view illustrating a process of detecting the end of the life of memory in a memory control method according to an embodiment of the present disclosure.

FIG. 4 is a view illustrating a process of detecting the end of the life of memory in a memory control method according to an embodiment of the present disclosure.

Referring to FIG. 4, when a first SSD (SSD1), a second SSD (SSD2), and a third SSD (SSD3) are set as active SSDs and a fourth SSD (SSD4) and a fifth SSD (SSD5) are set as standby SSDs, among multiple SSDs (SSD1 to SSD5), the case in which the end of the life of the first SSD (SSD1) is detected (that is, a condition for replacement is satisfied) is illustrated.

When the first SSD (SSD1), the second SSD (SSD2), and the third SSD (SSD3) are set as active SSDs, general data, excluding performance-sensitive data, may be stored in the first SSD (SSD1), the second SSD (SSD2), or the third SSD (SSD3). A data writing or reading operation may not be performed in the fourth SSD (SSD4) or the fifth SSD (SSD5), which are set as standby SSDs.

When it determines that the life of the first SSD (SSD1) ends, the life end detection unit 235 may prohibit writing to the first SSD (SSD1) and set any one (SSD4) of the standby SSDs (SSD4 and SSD5) as an active SSD to operate as indirect memory. Migration of the data stored in the first SSD (SSD1) reaching the end of its life may be performed using the above-described direct switch method or indirect switch method.

In the direct switch method, the switch control unit 237 may store all of the data stored in the active SSD (SSD1) reaching the end of its life in the newly set active SSD (SSD4).

In the indirect switch method, the switch control unit 237 may perform control so as to continue performing an operation of reading data from the active SSD (SSD1) reaching the end of its life but not to perform an operation of newly writing data thereto. When a switch condition for the active SSD (SSD1) reaching the end of its life is satisfied, the switch control unit 237 may store some data in the newly set active SSD (SSD4). For example, when the percentage of valid data for which a read operation is performed for six hours, among all of the data stored in the SSD (SSD1) reaching the end of its life, is less than 20%, the switch control unit 237 may determine that the switch condition is satisfied.

In an embodiment, when the number of remaining standby SSDs becomes 0, the switch control unit 237 may store the data stored in the SSD to which writing is prohibited in an additional active SSD (indirect switch) and generate an SSD replacement notification message. For example, when the life of the second active SSD (SSD2) ends and the second standby SSD (SSD5) is set as an active SSD in the state illustrated on the right side of FIG. 4, the number of remaining standby SSDs becomes 0. When the number of remaining standby SSDs becomes 0, there is no standby SSD to replace the active SSD when the active SSD fails or reaches the end of its life. Accordingly, the switch control unit 237 may perform the indirect switch method for the SSD (SSD1 or SSD2) to which writing is prohibited, and may generate an SSD replacement notification message. In response thereto, an administrator replaces the SSD (SSD1 or SSD2), to which writing is prohibited, with a new SSD and secure extra standby SSDs.

According to the above-described life end detection process, the end of the life of an active SSD is detected when the life ends or before the life ends. Accordingly, before an error occurs in the SSD used as memory due to the operation of writing to or reading from the SSD, a normally operating SSD may replace the SSD so as to be used as memory, whereby system shutdown attributable to the lack of memory capacity, which can be caused due to the end of the life of the SSD, may be prevented.

Figure 5:
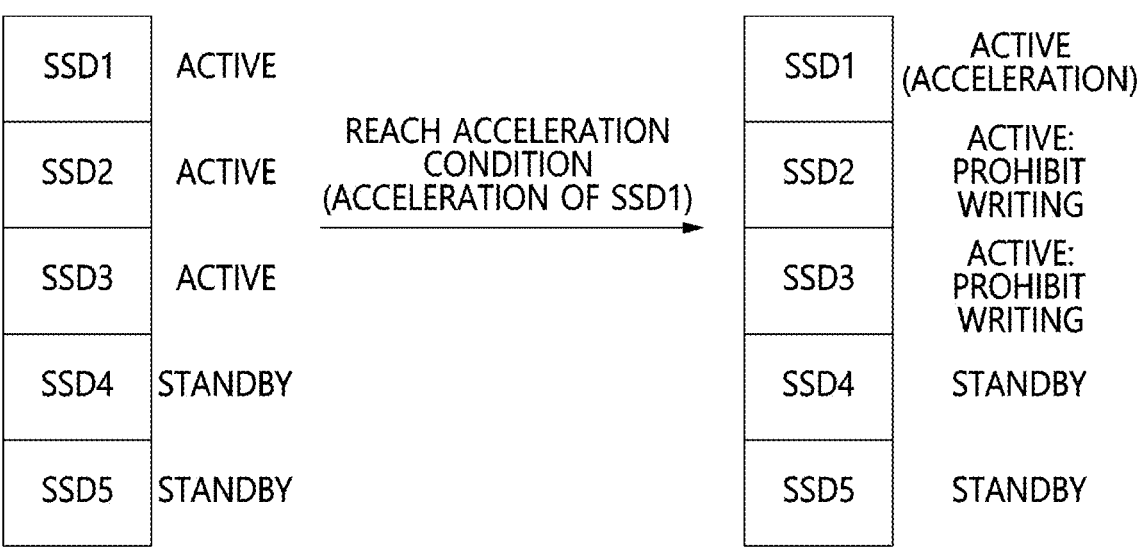
FIG. 5 is a view illustrating a process of accelerating writing in a memory control method according to an embodiment of the present disclosure.

FIG. 5 is a view illustrating a process of accelerating writing in a memory control method according to an embodiment of the present disclosure.

When a first SSD (SSD1), a second SSD (SSD2), and a third SSD (SSD3) are set as active SSDs and a fourth SSD (SSD4) and a fifth SSD (SSD5) are set as standby SSDs, among multiple SSDs (SSD1 to SSD5), the case in which the first SSD (SSD1) reaches an acceleration condition is described with reference to FIG. 5.

The write acceleration unit 239 may determine whether the number of writes to the active SSD (SSD1~SSD3) is greater than a preset threshold value (e.g., 70% of a limited number of lifetime writes). When the number of writes to the first active SSD (SSD1) is greater than the preset threshold value, the write acceleration unit 239 may determine that the first active SSD (SSD1) reaches the acceleration condition, and may set the first active SSD (SSD1) as an accelerating active SSD. The write acceleration unit 239 concentrates write operations to the first active SSD (SSD1), which is set as the accelerating active SSD, and may prevent an operation of writing to the other active SSDs (SSD2 and SSD3).

In another embodiment, the write acceleration unit 239 may determine whether the expected end-of-life dates of the active SSDs (SSD1~SSD3) fall within a certain period (e.g., one month). For example, assume that the expected end-of-life date of the first active SSD (SSD1) is calculated as May 1, 2022, the expected end-of-life date of the second active SSD (SSD2) is calculated as May 25, 2022, and the expected end-of-life date of the third active SSD (SSD3) is calculated as Oct. 7, 2022. Because the difference between the end-of-life dates of the first active SSD (SSD1) and the second active SSD (SSD2), which have the earliest end-of-life dates, is shorter than one month, the write acceleration unit 239 may set the first active SSD (SSD1) as an accelerating active SSD. The write acceleration unit 239 may concentrate write operations to the first active SSD (SSD1), which is set as the accelerating active SSD, and may prevent an operation of writing to the other SSDs (SSD2 and SSD3).

Figure 6:
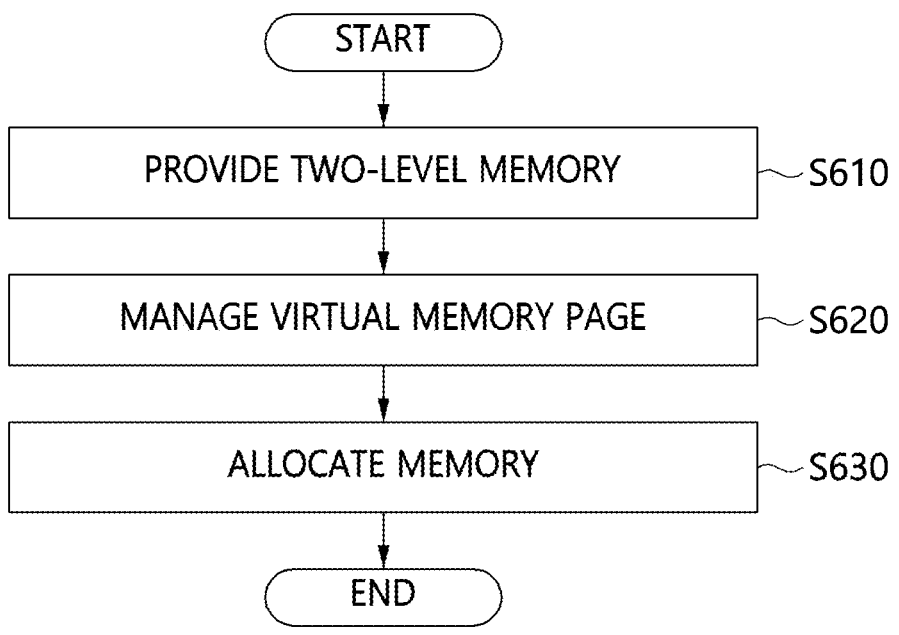
FIG. 6 is a flowchart illustrating a two-level memory management method according to an embodiment of the present disclosure.

FIG. 6 is a flowchart illustrating a two-level memory management method according to an embodiment of the present disclosure.

Referring to FIG. 6, the two-level memory management method may include providing two-level memory at step S610, managing a virtual memory page at step S620, and allocating memory at step S630.

At the step (S610) of providing two-level memory, a two-level memory unit 250, including random access memory for storing data and a Solid State Drive (SSD) for storing data, may be provided.

At the step (S620) of managing a virtual memory page, a memory page required for building or executing an application may be managed by a virtual machine unit 210.

At the step (S630) of allocating memory, a memory page may be allocated to at least one of the random access memory, or the SSD, or a combination thereof by a memory control unit 230 between the two-level memory unit 250 and the virtual machine unit 210.

The above descriptions of the virtual machine unit 210, the memory control unit 230, and the two-level memory unit 250 may be applied to the descriptions of the step (S610) of providing two-level memory, the step (S620) of managing a virtual memory page, and the step (S630) of allocating memory, which are performed by the two-level memory unit 250, the memory control unit 230, and the virtual machine unit 210.

Figure 7:
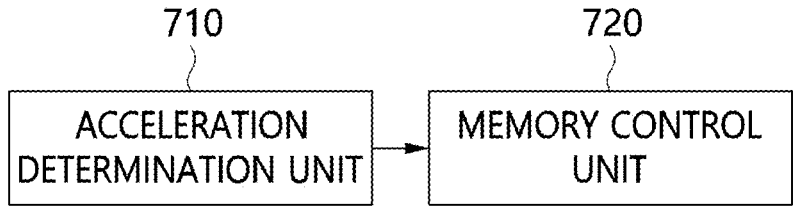
FIG. 7 is a block diagram illustrating a memory management apparatus in a memory disaggregation environment according to an embodiment of the present disclosure.

FIG. 7 is a block diagram illustrating a memory management apparatus in a memory disaggregation environment according to an embodiment of the present disclosure.

Referring to FIG. 7, a memory management apparatus in a memory disaggregation environment according to an embodiment of the present disclosure includes an acceleration determination unit 710 for determining whether a condition for allocation acceleration is satisfied by multiple first memory devices constituting virtual memory and a memory control unit 720 for allocating a memory page to the first memory devices based on whether the condition for allocation acceleration is satisfied.

Here, the condition for allocation acceleration may correspond to the case in which the cumulative number of writes to the first memory device relative to a threshold value of the number of writes is greater than a preset percentage.

Here, the memory control unit 720 may allocate a memory page corresponding to a write operation to the first memory device satisfying the condition for allocation acceleration.

Here, the condition for allocation acceleration may correspond to the case in which the end-of-life date of the first memory device and that of another first memory device fall within a preset period.

Here, the memory control unit 720 may allocate a memory page corresponding to a write operation to the first memory device having the earliest end-of-life date, among the first memory devices, the end-of-life dates of which fall within the preset period.

Here, the apparatus may further include a data classification unit for classifying the data to be stored into performance-sensitive data and general data, and the data classification unit may allocate the performance-sensitive data and the general data to the first memory device and a second memory device, respectively.

Here, the first memory device may correspond to a Solid State Drive (SSD), and the second memory device may correspond to Random Access Memory (RAM).

Here, the first memory devices may correspond to an active state or a standby state, and the memory control unit may allocate the memory page to the first memory devices in the active state.

Here, the memory control unit 720 may perform control to prohibit a write operation in the first memory device reaching the end of its life, among the first memory devices in the active state, and to migrate data in the first memory device reaching the end of its life to the first memory device in the standby state.

Here, the memory control unit 720 may use a direct migration method by which the data of the first memory device reaching the end of its life is stored in the first memory device in the standby state and an indirect migration method by which, when data transferred to the first memory device through a read operation is modified, the modified data is stored in the first memory device in the standby state.

Here, the memory control unit 720 may generate a first memory replacement message when the number of first memory devices in the standby state is less than a preset number.

According to the present disclosure, a memory management method capable of providing reliable, high-capacity memory at low cost may be provided.

Also, the present disclosure may prevent errors caused due to a limit on the number of writes when a memory system is configured using a medium having a limit on the number of writes, such as a Solid State Drive (SSD), or the like.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. An apparatus for memory management in a memory disaggregation environment, comprising:
 an acceleration determination unit for determining whether a condition for allocation acceleration is satisfied by multiple first memory devices constituting virtual memory; and
 a memory control unit for allocating a memory page to the first memory devices based on whether the condition for allocation acceleration is satisfied,
 wherein the condition for allocation acceleration corresponds to a case in which an end-of-life date of a first memory device and that of an additional first memory device fall within a preset period, and the allocating the memory page comprises allocating a memory page corresponding to a write operation to a first memory device having an earliest end-of-life date, among first memory devices with end-of-life dates of which fall within the preset period.

2. The apparatus of claim 1, wherein the condition for allocation acceleration corresponds to a case in which a cumulative number of writes to a first memory device relative to a threshold value of the number of writes is greater than a preset percentage.

3. The apparatus of claim 2, wherein the memory control unit allocates a memory page corresponding to a write operation to the first memory device satisfying the condition for allocation acceleration.

4. The apparatus of claim 1, further comprising:
 a data classification unit for classifying data to be stored into performance-sensitive data and general data,
 wherein the data classification unit allocates the performance-sensitive data to a second memory device and allocates the general data to the first memory devices.

5. The apparatus of claim 4, wherein:
 the first memory devices correspond to a Solid State Drive (SSD), and
 the second memory device corresponds to Random Access Memory (RAM).

6. The apparatus of claim 1, wherein:
 the first memory devices individually correspond to an active state or a standby state, and
 the memory control unit allocates the memory page to first memory devices in the active state.

7. The apparatus of claim 6, wherein the memory control unit performs control to prohibit a write operation in a first memory device reaching an end of its life, among the first memory devices in the active state, and to migrate data in the first memory device reaching the end of its life to a first memory device in the standby state.

8. The apparatus of claim 7, wherein the memory control unit uses a direct migration method by which the data in the first memory device reaching the end of its life is stored in the first memory device in the standby state or an indirect migration method in which operations of reading data from the first memory device reaching the end of its life are continued but operations of writing data to the first memory device reaching the end of its life are not performed.

9. The apparatus of claim 6, wherein the memory control unit generates a first memory replacement message when a number of first memory devices in the standby state is less than a preset number.

* * * * *